US010211914B2

(12) United States Patent
Stayton

(10) Patent No.: US 10,211,914 B2
(45) Date of Patent: Feb. 19, 2019

(54) SYSTEMS AND METHODS FOR PROVIDING REMOTE L-BAND SMART ANTENNAS

(71) Applicant: Gregory T. Stayton, Peoria, AZ (US)

(72) Inventor: Gregory T. Stayton, Peoria, AZ (US)

(73) Assignee: AVIATION COMMUNICATION & SURVEILLANCE SYSTEMS, LLC, Phoenix, AZ (US)

( * ) Notice: Subject to any disclaimer, the term of this patent is extended or adjusted under 35 U.S.C. 154(b) by 246 days.

(21) Appl. No.: 13/678,224

(22) Filed: Nov. 15, 2012

(65) Prior Publication Data
US 2013/0121219 A1 May 16, 2013

Related U.S. Application Data

(60) Provisional application No. 61/560,104, filed on Nov. 15, 2011.

(51) Int. Cl.
H04B 7/26 (2006.01)
H04B 7/185 (2006.01)

(52) U.S. Cl.
CPC ........... *H04B 7/26* (2013.01); *H04B 7/18506* (2013.01)

(58) Field of Classification Search
CPC .. G01S 13/9303; G01S 7/4008; G01S 13/765; G01S 13/93; G01S 13/88; G08G 5/0004; G08G 5/0073; G08G 5/0008; G08G 5/0013; G08G 5/04; G08G 5/00
See application file for complete search history.

(56) References Cited

U.S. PATENT DOCUMENTS

| 6,353,846 | B1* | 3/2002 | Fleeson .................... 718/104 |
| 6,999,022 | B1* | 2/2006 | Vesel et al. ................ 342/30 |
| 8,254,869 | B2  | 8/2012 | Hyde et al. |
| 2005/0156777 | A1* | 7/2005 | King et al. ................ 342/29 |

OTHER PUBLICATIONS

IEEE 802.3-2008, "IEEE Standard for Information technology—Telecommunications and information exchange between systems—Local and metropolitan area networks—Specific requirements", Sep. 2008, IEEE, all pages.*

* cited by examiner

Primary Examiner — Jung Liu
(74) Attorney, Agent, or Firm — Dickinson Wright PLLC

(57) ABSTRACT

Various avionics systems may benefit from providing remote L-band smart antennas. For example, smart antennas may be used in connection with transponders and other avionics equipment. The smart antenna may incorporate functionality that may obviate the need for coaxial RF cabling. According to certain embodiments, an avionics system may include an antenna having at least a radio frequency function included therewith. The avionics system may also include a data bus connecting the antenna to a digital receiver at avionics processing hardware.

23 Claims, 6 Drawing Sheets

SYSTEMS AND METHODS FOR PROVIDING REMOTE L-BAND SMART ANTENNAS

CROSS REFERENCE TO RELATED APPLICATIONS

This application claims the benefit of U.S. Provisional Patent Application No. 61/560,104 filed Nov. 15, 2011, the disclosure of which is fully incorporated herein by reference for all purposes.

DESCRIPTION OF THE INVENTION

Field of the Invention

Various avionics systems may benefit from provision of remote L-band smart antennas. For example, smart antennas may be used in connection with transponders and other avionics equipment. The smart antenna may incorporate functionality that may obviate the need for coaxial radio frequency cabling and associated equipment.

Background of the Invention

Current L-Band avionics system functions, such as traffic alert and collision avoidance system (TCAS), Mode S transponders, air traffic control radar beacon system (ATCRBS) transponders, automatic dependent surveillance-broadcast (ADS-B) IN or OUT and distance measuring equipment (DME), provide stand-alone or integrated functional architectures where each single functional unit or integrated functional unit also contains the radio frequency (RF) function or functions. This architecture requires an RF interface to a single or multiple coaxial cables that interconnect the RF function to an antenna. For instance, in the case of a single TCAS unit, there are currently four TCAS to antenna interconnecting RF coaxial cables for both the top and bottom directional antennas, or in the case of a bottom omni-antenna installation, there is a single interconnecting RF cable from the TCAS unit to the bottom omni-antenna.

SUMMARY OF THE INVENTION

Both the foregoing summary and the following detailed description are exemplary and explanatory only and are not restrictive of the invention as claimed.

According to certain embodiments, an avionics system may include an antenna having at least a radio frequency function included therewith. The avionics system may also include a data bus connecting the antenna to a digital receiver at avionics processing hardware.

In certain embodiments, a method may include performing a radio frequency operation in a radio frequency function of an antenna. The method may also include transmitting or receiving data on a data bus connecting the antenna to a digital receiver at avionics processing hardware, in connection with the radio frequency operation.

A method, according to certain further embodiments, may include performing a radio frequency operation in a radio frequency function of an antenna. The method may also include transmitting or receiving an analog signal on a bus connecting the antenna to a receiver at avionics processing hardware, in connection with the radio frequency operation.

According to certain further embodiments, an avionics system may include an antenna having at least a radio frequency function included therewith. The system may also include an analog bus connecting the antenna to a digital receiver at avionics processing hardware.

BRIEF DESCRIPTION OF THE DRAWINGS

A more complete understanding of the present invention may be derived by referring to the detailed description and claims when considered in connection with the following illustrative figures.

DETAILED DESCRIPTION OF EXEMPLARY EMBODIMENTS

Certain embodiments of the present invention may provide a way to separate, as a whole or in part, the RF function from the processing function of the avionics units, such as TCAS, Mode S Transponders, ATCRBS Transponders, ADS-B IN or Out, and DME, using a smart antenna that may contain the RF and associated input/output (I/O) and power supply. This may be made possible by at least two differing methods.

According to a first embodiment of the present invention, an RF function may be contained within a smart antenna. The smart antenna may provide the output of the RF function to a processing function or set of functions over a digital bus with a wide bandwidth. This digital bus may be, for example, a fiber optic cable. The output of the RF function toward the bus and the input of the RF function from the bus may be a digitized sampled waveform. Thus, RF data can be directly transmitted and received between the smart antenna and the processing unit.

According to certain embodiments, a smart antenna can be connected to a processing unit over a slower bandwidth data bus, such as an Ethernet cable. In such an embodiment, a high speed processor and/or a FPGA firmware device can be used to pre-process the RF transmission and receiver data into encoded/decoded data bit messages that can be processed in real time by the processing unit. The message data supplied to the processor may already have been converted from a sampled waveform to message data within the smart antenna, thereby reducing the number of processing computations by greater than an order of magnitude.

Figure 1:
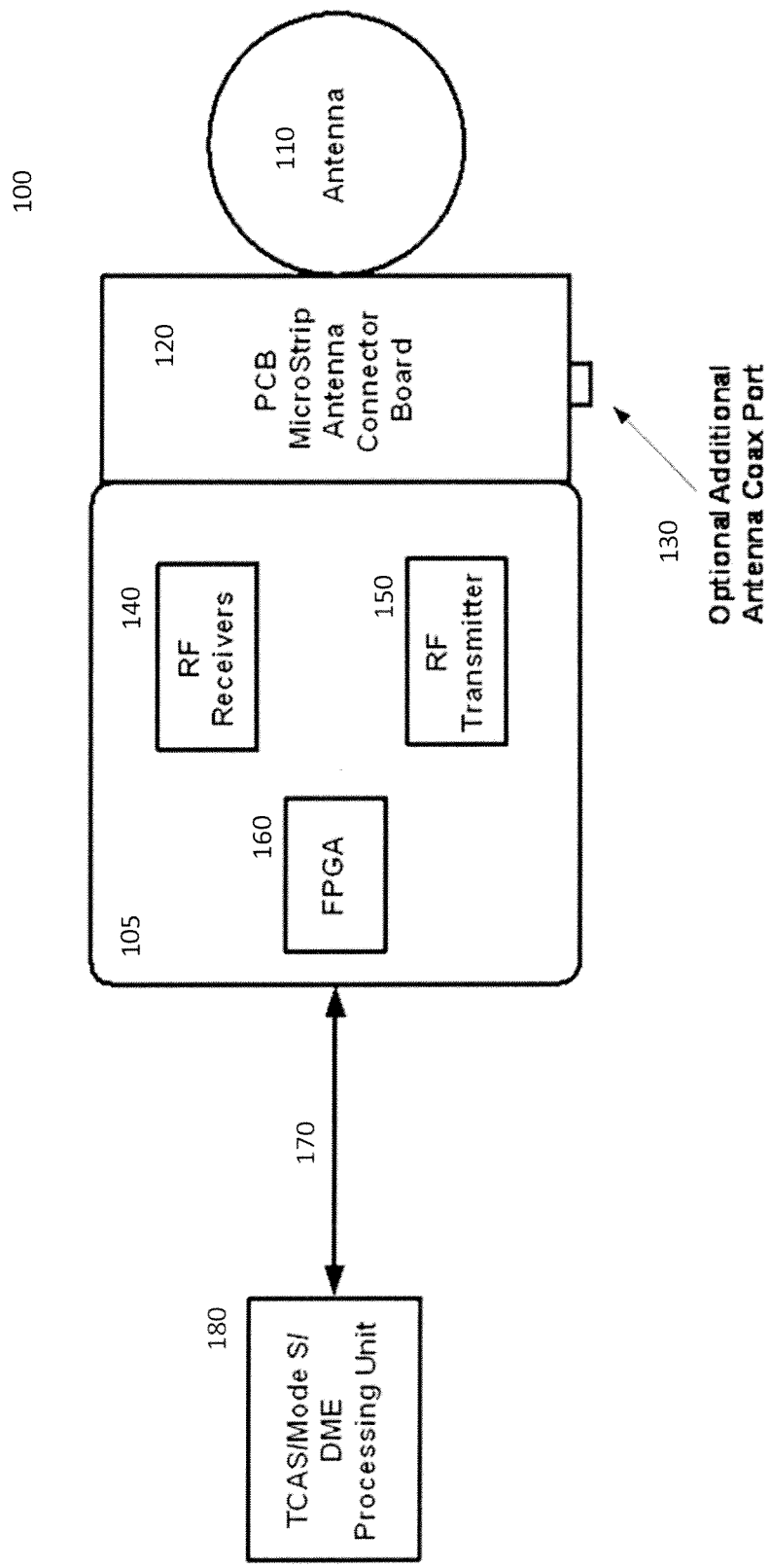
FIG. 1 shows an exemplary high level block diagram of a system according to certain embodiments.

FIG. 1 shows an exemplary high level block diagram of an integrated TCAS, Mode S and DME smart antenna system that may be interconnected to a processing unit with either a wide bandwidth sample based interface or slower bandwidth message based interface bus. It should be noted that alternatively the wide bandwidth interface could be used with the messages and vice versa.

As shown in FIG. 1, a system 100 may include an antenna 110. The system 100 may also include a printed circuit board (PCB) microstrip antenna connector board 120. The system 100 may further include one or more RF receivers 140, one or more RF transmitters 150, and one or more FPGA(s) 160. These or other features may be provided within an enclosure 105. A data bus 170 may connect the enclosure 105 to a processing unit 180 for processing TCAS/Mode S/DME.

Figure 2:
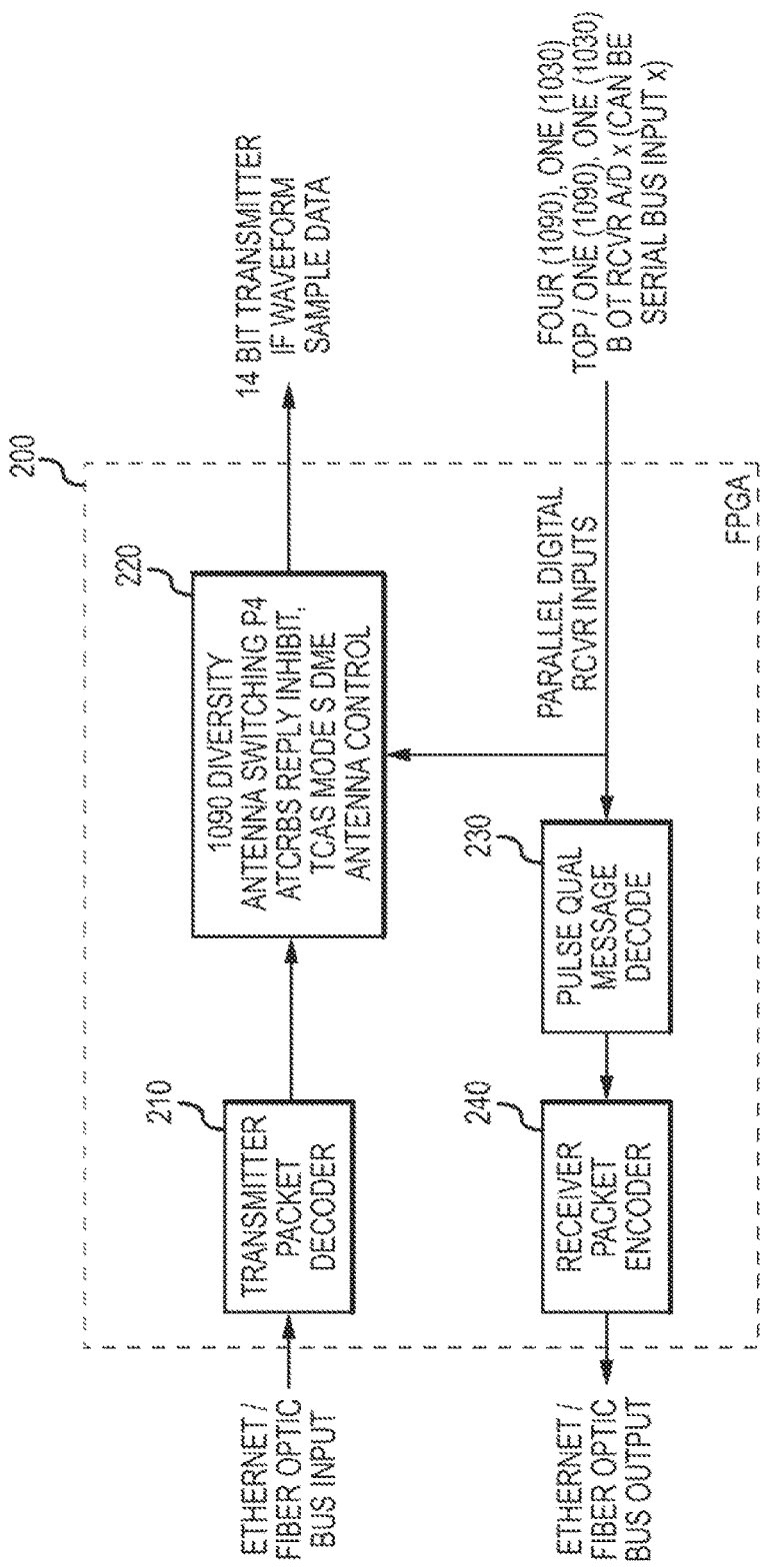
FIG. 2 shows an example of the smart antenna field programmable gate array (FPGA) high level functions according to certain embodiments.

FIG. 2 shows an example of the smart antenna FPGA high level functions that may decode incoming sample data from the RF receivers into messages that can be sent to the processing unit over a data bus. It also shows an example of the smart antenna FPGA high level functions that may encode messages received from the processing unit into a waveform or set of waveforms to be transmitted on the RF transmitters through the antenna.

As shown in FIG. 2, an FPGA 200 may have a variety of inputs and processing. For example, FPGA 200 can include a transmitter packet decoder 210 that is configured to receive an Ethernet/fiber optic bus Input. The transmitter packet decoder 210 may be operationally connected to antenna functionality 220, which can include 1090 diversity antenna switching/P4 ATCRBS reply inhibit, TCAS/Mode S/DME antenna control. The antenna functionality 220 can also receive one or more of parallel digital receiver inputs, which can also be serial bus inputs. The inputs can include, for example four 1090 and one 1030 on top, and one 1030 on bottom, which can be from receiver analog/digital (A/D) converters. These digital inputs can also be provided pulse quality/message decoder 230. The output of decoder 230 may be provided to the receiver packet encoder 240, which may provide the packets to an Ethernet/fiber optic bus output. The Ethernet/fiber optic bus input and the Ethernet/fiber optic bus output are illustrated separately but may be the same physical medium.

Additionally, the FPGA may include built in test circuitry data for the smart antenna into the messages sent to the processing unit over a data bus or as an example command, control, or mode message(s) sent from the processing unit to the smart antenna. This bus interface may include, as an example, one or more busses that may have analog or digital signals present on the bus/busses to provide all signals and data to transmit and receive RF signals and send/receive the information to the processing unit.

Figure 3:
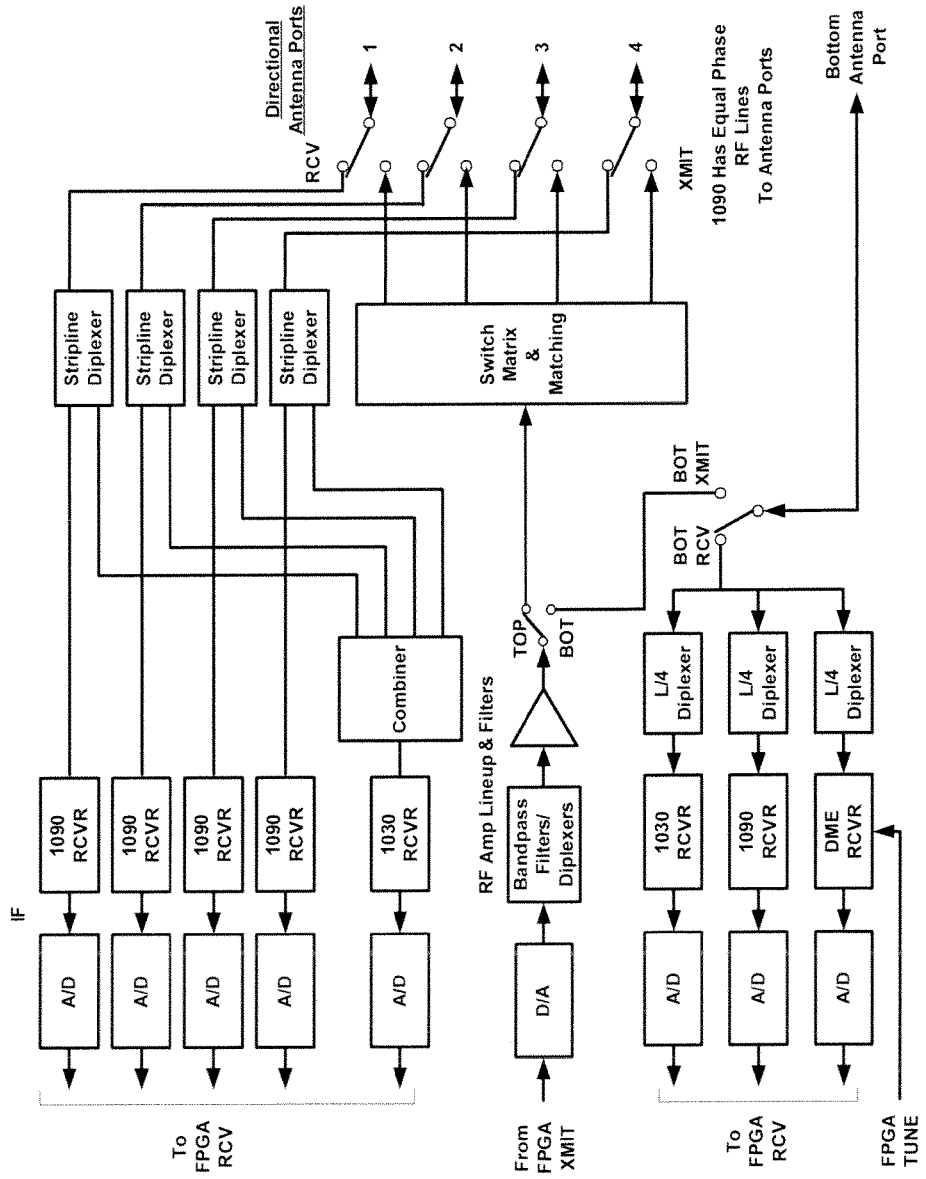
FIG. 3 shows an example of smart antenna transmitters and receivers and RF switching between multiple antennas, according to certain embodiments.

FIG. 3 shows an example of smart antenna transmitters and receivers and RF switching between multiple antennas, such as the top and bottom antennas of a TCAS/Mode S/DME system. Thus, for example, FIG. 3 illustrates various A/D converters and receivers that can be used for providing a digital input to an FPGA receiver input after first converting the signal to an intermediate frequency. The signal can be received from a directional antenna port and split via stripline diplexer, as shown.

Likewise, FIG. 3 illustrates a digital to analog (D/A) converter than can be used to transmit data from the FPGA, using hardware such as band pass filters and diplexers, as well as amplifiers. A switch may be used to switch the transmission path between a top antenna path and a bottom antenna path. In a case where the top antenna path has multiple antennas or multiple antenna elements, a switch matrix and matching can be used to provide the appropriate output to the antennas/antenna elements. Additionally, the hardware may include tuning capability, which can be controlled by the FPGA. All the features shown in FIG. 3 are optional and merely reflect an example implementation.

Figure 4:
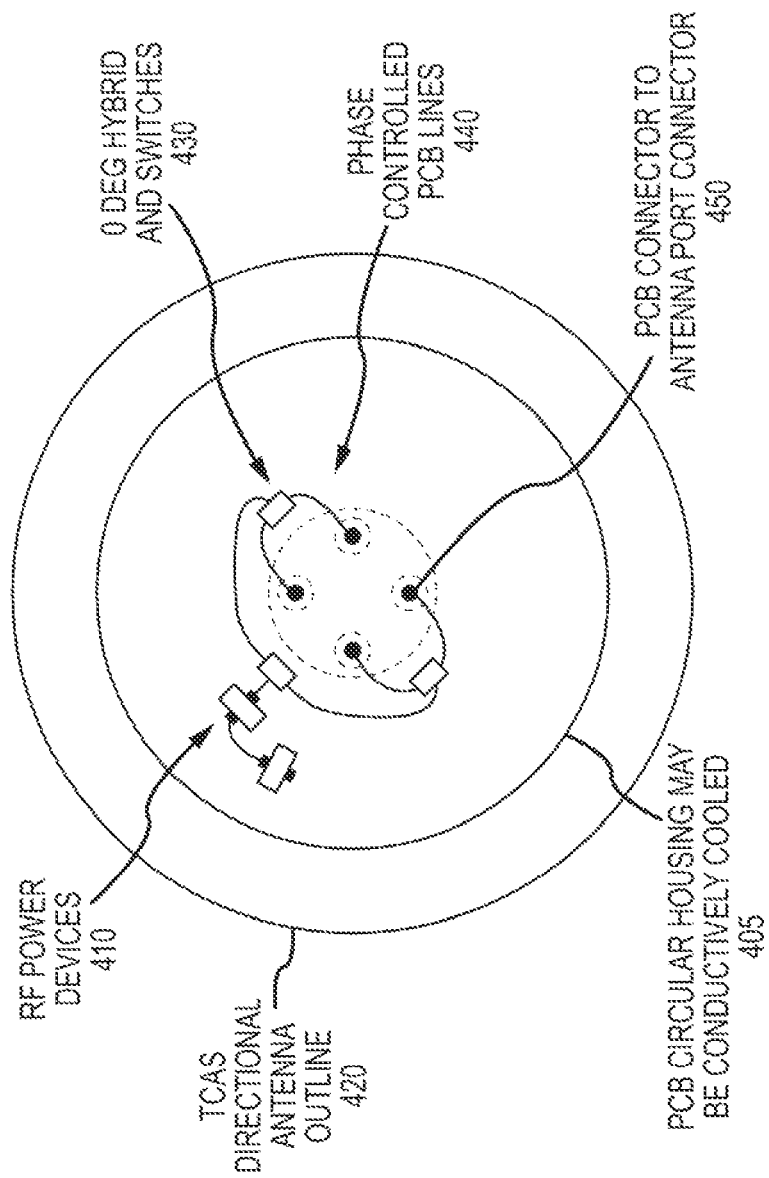
FIG. 4 shows an example of a notional physical view of a smart antenna according to certain embodiments.

FIG. 4 shows an example of a smart antenna notional physical view. As shown in FIG. 4, a printed circuit assembly may be contained within a physical enclosure of a smart antenna and may use phase matched connections to an antenna to control antenna patterning that may be required. The antenna, as an example, can thus be fed RF signals for the transmitter and provide signals from the receivers to the processing unit with very low insertion loss, eliminating the coaxial feed line losses. Coaxial feed line losses of up to 3 dB are typically allowed for TCAS/Mode S/DME avionics (see RTCA DO-181, DO-185, and DO-189).

As shown in FIG. 4, the smart antenna may include RF power devices 410 within a PCB circular housing 405 that fits within the outline 420 of a TCAS directional antenna. The RF power devices 420 may be connected via zero degree hybrid and switches to phase controlled PCB lines 440. In turn, the phase controlled PCB lines 440 can be provided to PCB connectors 450 connecting to an antenna port connector. The PCB circular housing 405 may be conductively cooled. Other cooling techniques are also permitted.

The smart antenna transmit and receive pattern according to certain embodiment may be more readily controlled than with prior control approaches, to provide a quadrant beam or omnidirectional beam in space, as may be required for TCAS/Mode S/DME equipment. This ready control may be due to the printed circuit assembly matched phase of the electrical RF interface connecting to the antenna ports. A matched phase can be more simply maintained with short matched electrical line lengths on a printed circuit board, as opposed to using lengthy coaxial cables to connect an antenna to an integral processing RF unit.

Certain embodiments of the present invention may provide a variety of benefit and/or advantages as compared to an integral processing and RF unit. For example, coax losses between the unit and the antenna can be eliminated, resulting in lower power RF transmission components than would be required to deliver the same RF power at the antenna as an integral unit.

Higher system reliability, resulting from the lower power dissipation of the RF power and smaller power switching and capacitor components within the smart antenna and its associated power supply.

Certain embodiments of the present invention may be lower weight due to smaller components and replacement of heavier RF coaxial cable runs with smaller and lighter weight cables. For example, Ethernet, shielded twisted pair, or fiber optic cable runs may be used in an aircraft instead of the RF coaxial cable runs.

Certain embodiments may also permit a more generic architecture. For example, general processors can be used, as opposed to uniquely and integrally combined RF and processing units. This can more readily provide for software functions from a variety of suppliers on a common processor platform, improving competition, quality and lowering cost while providing best-in-class system functionality for the original equipment manufacturer (OEM) users.

In certain embodiments, there may be a lower initial cost, because coax cables are eliminated. Moreover, smaller less expensive components can be used since coax losses have been reduced or eliminated.

In certain embodiments, phase matching of multiple RF inputs to the antenna to provide the various antenna patterns in space can be more simply controlled through the use of short printed circuit board traces, as opposed to longer coaxial runs. For example, coaxial runs may be affected by repairs and environmental effects, such as temperature, which can significantly change the phase lengths of the coaxial runs relative to one another.

Because phase matching through the use of short printed circuit board traces may be more readily achieved over longer coaxial cables runs, in certain embodiments a single transmitter can be used to feed more than one antenna port to provide a fixed antenna pattern. This approach may eliminate the need for multiple transmitters transmitting with various phases to produce any necessary antenna pattern. This approach may significantly reduce transmitter complexity and may improve transmitter reliability, as well as lowering system cost, since fewer electrical components may be needed.

Figure 5:
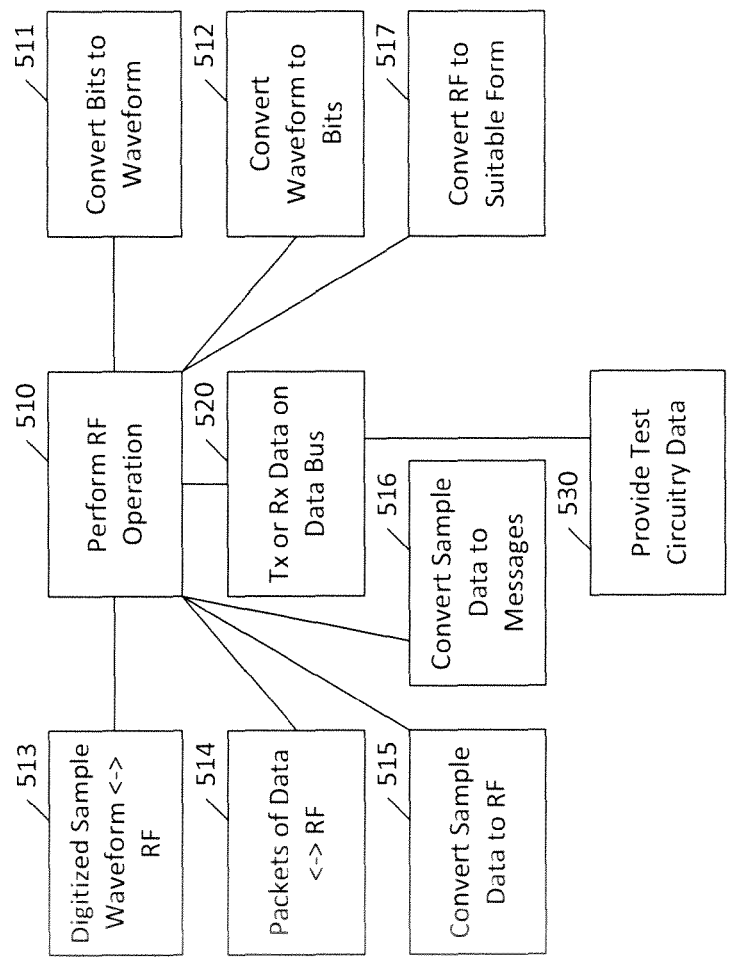
FIG. 5 illustrates a method according to certain embodiments.

FIG. 5 illustrates a method according to certain embodiments. As shown in FIG. 5, the method may include, at 510, performing a radio frequency operation in a radio frequency function of an antenna. The radio frequency function of the antenna may be embodied various ways, such as by a FPGA or PCB.

The method may also include, at 520, transmitting or receiving data on a data bus connecting the antenna to a digital receiver at avionics processing hardware, in connection with the radio frequency operation.

The method may further include, at 511, the antenna converting data bits received over the data bus into an uplink waveform. Also, or alternatively, the method may additionally include, at 512, the antenna converting a downlink waveform into data bits to be transmitted over the data bus.

Data bits transmitted or received over the data bus may include a digitized sampled waveform. The method may include, at 513, converting the digitized sample waveform between digitized sample waveform and radio frequency in the antenna.

In another embodiment, data bits transmitted or received over the data bus may include packets of data. The method may include, at 514, converting the packets of data between packets of data and radio frequency in the antenna.

The method may include, at 515, a field programmable gate array in the antenna converting between sample data and a radio frequency waveform. The method may also include, at 516, a field programmable gate array in the antenna converting between sample data and messages to be sent over the data bus.

The method may also include, at 517, converting, by a printed circuit board, the radio frequency waveform to a form suitable for transmission over the data bus.

The method may further include, at 530, providing, by a field programmable gate array, test circuitry data in messages over the data bus.

Figure 6:
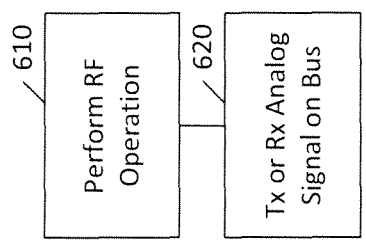
FIG. 6 illustrates another method according to certain embodiments.

FIG. 6 illustrates another method according to certain embodiments. The method includes, at 610, performing a radio frequency operation in a radio frequency function of an antenna. The method may also include, at 620, transmitting or receiving an analog signal on a bus connecting the antenna to a receiver at avionics processing hardware, in connection with the radio frequency operation.

For example, a connection from a computer to the smart antenna can also be or include an analog signal or bus for communicating such signal. The analog signal may be processed for transmission or upon reception by or from the antenna element/elements. For instance, a modulated waveform at low power level may be sent on a cable to the smart antenna where it is amplified and sent out omni-directionally or directionally (for example, correctly) based on some property of the analog signal, such as frequency or modulation type. Also, the same may be true for the received signal. For example, the received signal could be amplified and/or filtered and sent in an analog manner down to the computer and the computer could additionally process the signal and determine what to do with it based on the frequency or modulation type. The analog signal may be transmitted on a coaxial cable, but the analog signal may be relatively insensitive to issues like cable length. Also the analog method can include an associated discrete or digital signal to tell the computer or the smart antenna what to do with the analog signal.

Other embodiments are also possible. For example, two or more channels can be transmitted between the antenna and the processing unit or computer. For example, one channel may be for control information regarding data, and the other channel can be for the data itself. In certain embodiments, the smart antenna may communicate with the processor wirelessly, using, for example a wireless local area network protocol. In such an embodiment, no cabling between the processing unit and the antenna may be required.

The particular implementations shown and described above are illustrative of the invention and its best mode and are not intended to otherwise limit the scope of the present invention in any way. Indeed, for the sake of brevity, conventional data storage, data transmission, and other functional aspects of the systems may not be described in detail. Methods illustrated in the various figures may include more, fewer, or other steps. Additionally, steps may be performed in any suitable order without departing from the scope of the invention. Furthermore, the connecting lines shown in the various figures are intended to represent exemplary functional relationships and/or physical couplings between the various elements. Many alternative or additional functional relationships or physical connections may be present in a practical system.

Changes and modifications may be made to the disclosed embodiments without departing from the scope of the present invention. These and other changes or modifications are intended to be included within the scope of the present invention, as expressed in the following claims.

What is claimed is:

1. An avionics system, comprising:
  an antenna having at least a radio frequency function included within the antenna, wherein the radio frequency function is configured to communicate digital signals; and
  a data bus connecting the radio frequency function of the antenna to a digital receiver configured to process the digital signals at avionics processing hardware.

2. The system of claim 1, wherein the antenna is further configured to convert data bits received over the data bus into an uplink waveform.

3. The system of claim 1, wherein the antenna is further configured to convert a downlink waveform into data bits to be transmitted over the data bus.

4. The system of claim 1, wherein the data bus comprises at least one of a fiber optic link or an Ethernet cable.

5. The system of claim 1, wherein data bits transmitted or received over the data bus comprise a digitized sampled waveform, wherein the digitized sample waveform is converted between digitized sample waveform and radio frequency in the antenna.

6. The system of claim 1, wherein data bits transmitted or received over the data bus comprise packets of data, wherein the packets of data are converted between packets of data and radio frequency in the antenna.

7. The system of claim 1, wherein the antenna comprises a field programmable gate array configured to convert between sample data and a radio frequency waveform.

8. The system of claim 1, wherein the antenna comprises a field programmable gate array configured to convert between sample data and messages to be sent over the data bus.

9. The system of claim 1, wherein the antenna comprises a field programmable gate array configured to provide test circuitry data in messages over the data bus.

10. The system of claim 1, wherein the antenna comprises an enclosure with a printed circuit board within the enclosure, wherein the printed circuit board is configured to convert the radio frequency waveform to a form suitable for transmission over the data bus.

11. A method, comprising:
performing a radio frequency operation in a radio frequency function of an antenna, wherein the radio frequency function is configured to communicate digital signals; and
transmitting or receiving data on a data bus connecting the radio frequency function within the antenna to a digital receiver configured to process the digital signals at avionics processing hardware, in connection with the radio frequency operation.

12. The method of claim 11, further comprising the antenna converting data bits received over the data bus into an uplink waveform.

13. The method of claim 11, further comprising the antenna converting a downlink waveform into data bits to be transmitted over the data bus.

14. The method of claim 11, wherein data bits transmitted or received over the data bus comprise a digitized sampled waveform, the method further comprising converting the digitized sample waveform between digitized sample waveform and radio frequency in the antenna.

15. The method of claim 11, wherein data bits transmitted or received over the data bus comprise packets of data, the method further comprising converting the packets of data between packets of data and radio frequency in the antenna.

16. The method of claim 11, further comprising a field programmable gate array in the antenna converting between sample data and a radio frequency waveform.

17. The method of claim 11, further comprising a field programmable gate array in the antenna converting between sample data and messages to be sent over the data bus.

18. The method of claim 11, further comprising providing by a field programmable gate array test circuitry data in messages over the data bus.

19. The method of claim 11, further comprising converting, by a printed circuit board, the radio frequency waveform to a form suitable for transmission over the data bus.

20. A method, comprising:
performing a radio frequency operation in a radio frequency function of an antenna, wherein the radio frequency function is configured to communicate digital signals; and
transmitting or receiving an analog signal on a bus connecting the radio frequency function within the antenna to a receiver configured to process the digital signals at avionics processing hardware, in connection with the radio frequency operation.

21. An avionics system, comprising:
an antenna having at least a radio frequency function included within the antenna, wherein the radio frequency function is configured to communicate digital signals; and
an analog bus connecting the radio frequency function of the antenna to a digital receiver configured to process the digital signals at avionics processing hardware.

22. The system of claim 1, wherein the radio frequency function is a system.

23. The system of claim 1, wherein the data bus extends from the antenna to the digital receiver.

* * * * *